(12) United States Patent
Manadhata et al.

(10) Patent No.: US 10,122,722 B2
(45) Date of Patent: Nov. 6, 2018

(54) RESOURCE CLASSIFICATION USING RESOURCE REQUESTS

(71) Applicant: HEWLETT PACKARD ENTERPRISE DEVELOPMENT LP, Houston, TX (US)

(72) Inventors: Pratyusa Kumar Manadhata, Princeton, NJ (US); Prasad V Rao, Princeton, NJ (US); William G Horne, Princeton, NJ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 193 days.

(21) Appl. No.: 14/899,640

(22) PCT Filed: Jun. 20, 2013

(86) PCT No.: PCT/US2013/046804
§ 371 (c)(1),
(2) Date: Dec. 18, 2015

(87) PCT Pub. No.: WO2015/099635
PCT Pub. Date: Jul. 2, 2015

(65) Prior Publication Data
US 2016/0142432 A1    May 19, 2016

(51) Int. Cl.
*H04L 29/06* (2006.01)
*H04L 29/08* (2006.01)

(52) U.S. Cl.
CPC .......... *H04L 63/101* (2013.01); *H04L 63/102* (2013.01); *H04L 63/105* (2013.01);
(Continued)

(58) Field of Classification Search
CPC ........................... H04L 63/101; H04L 63/102
See application file for complete search history.

(56) References Cited

U.S. PATENT DOCUMENTS 8,176,079 B1 *  5/2012  Spertus ............. G06F 17/30867
                                                    707/785
8,972,376 B1 *  3/2015  Gailis ............... G06F 17/30864
                                                    706/12
(Continued)

OTHER PUBLICATIONS

Rajalakshmi, R.; Aravindan, Chandrabose; "Web Page Classification using n-gram based URL Features", Fifth International Conference on Advanced Computing, IEEE, Dec. 18-20, 2013, pp. 15-21.*

(Continued)

*Primary Examiner* — Victor Lesniewski
(74) *Attorney, Agent, or Firm* — Hewlett Packard Enterprise Patent Department (57) ABSTRACT

In one implementation, a resource classification system identifies a plurality of resource requests and generates a plurality of resource access measures based on the plurality of resource requests. Each resource request from the plurality of resource requests is associated with a resource from a plurality of resources by a resource identifier of that resource. Each resource access measure from the plurality of resource access measures is associated with a resource from the plurality of resources. The resource classification system applies a classifier to each resource access measure from the plurality of resource access measures to generate a classification result for the resource from the plurality of resources associated with that resource access measure, and assign a security classification to each resource from the plurality of resources based on the classification result for that resource.

15 Claims, 5 Drawing Sheets

(52) U.S. Cl.
CPC .......... *H04L 63/14* (2013.01); *H04L 63/1433* (2013.01); *H04L 67/02* (2013.01)

(56) References Cited

U.S. PATENT DOCUMENTS

| | | | |
|---|---|---|---|
| 2007/0214503 A1* | 9/2007 | Shulman | G06F 11/2257 726/22 |
| 2008/0133540 A1* | 6/2008 | Hubbard | H04L 63/101 |
| 2008/0162448 A1* | 7/2008 | Jalan | G06F 17/30864 |
| 2008/0172382 A1 | 7/2008 | Prettejohn | |
| 2009/0138446 A1* | 5/2009 | Kalavade | G06Q 10/0637 |
| 2009/0300768 A1 | 12/2009 | Kirshnamurthy et al. | |
| 2010/0153539 A1* | 6/2010 | Zarroli | G06F 17/30864 709/224 |
| 2010/0154058 A1 | 6/2010 | Kay | |
| 2011/0167495 A1 | 7/2011 | Antonakakis et al. | |
| 2011/0185436 A1* | 7/2011 | Koulinitch | G06F 21/6218 726/28 |
| 2011/0191342 A1* | 8/2011 | Cohen | G06Q 30/02 707/737 |
| 2012/0016959 A1* | 1/2012 | O'Laughlen | G06F 17/30702 709/217 |
| 2012/0036580 A1 | 2/2012 | Gorny et al. | |
| 2012/0060221 A1* | 3/2012 | Gerber | G06F 21/56 726/25 |
| 2012/0150831 A1* | 6/2012 | Sun | G06F 17/30867 707/706 |
| 2012/0158626 A1* | 6/2012 | Zhu | G06F 21/56 706/13 |
| 2012/0198549 A1 | 8/2012 | Antonakakis et al. | |
| 2012/0271941 A1* | 10/2012 | Mirandette | G06F 17/30876 709/224 |
| 2012/0303808 A1 | 11/2012 | Xie | |
| 2012/0304244 A1 | 11/2012 | Xie et al. | |
| 2012/0317068 A1* | 12/2012 | Ruf | H04L 43/028 706/47 |
| 2013/0031630 A1 | 1/2013 | Krishnamurthy et al. | |
| 2013/0091128 A1* | 4/2013 | Radinsky | G06F 17/30129 707/723 |
| 2014/0033307 A1* | 1/2014 | Schmidtler | H04L 63/1483 726/22 |

OTHER PUBLICATIONS

Yu, Liquan; Xiao, Meihua; "Review and Evaluation of Classification Algorithms Enhancing Internet Security", International Conference on Web Information Systems and Mining, IEEE, Oct. 23-24, 2010, vol. 1, pp. 276-278.*
Aldwairi, Monther et al.. "MALURLS: A Lightweight Malicious Website Classification Based on URL Features." Journal of Emerging Technologies in Web Intelligence 4.2 (2012): 128-133.
Bilge, Leyla, et al. "EXPOSURE: Finding Malicious Domains Using Passive DNS Analysis." Proceedings of NDSS. Feb. 7, 2011.
Devesa, Jaime, et al. "Automatic behaviour-based analysis and classification system for malware detection." Proceedings of the 12th International Conference on Enterprise Information Systems (ICEIS). 2010.
International Search Report & Written Opinion, dated Jun. 30, 2015, PCT Patent Application No. PCT/US2013/046804, 10 pages.
Ma, Justin, et al. "Beyond Blacklists: Learning to Detect Malicious Web Sites from Suspicious URLs." Proceedings of the 15th ACM SIGKDD international conference on Knowledge discovery and data mining. ACM, 2009.

* cited by examiner

RESOURCE CLASSIFICATION USING RESOURCE REQUESTS

BACKGROUND

Many resources accessible via communications networks such as the Internet are malicious. Organizations often employ blacklist and/or whitelist approaches to prevent access to malicious resources. For example, an organization may compile or access a list of resource identifiers that identify resources that are believed to be malicious. Such a list is often referred to as a blacklist. The organization may prevent its internal hosts (e.g., computing systems) from accessing such malicious resources by blocking resource requests that include or are directed to resource identifiers on the blacklist. In other words, the resources identified by the resource identifiers on the blacklist can be said to be blacklisted.

Similarly, an organization may compile or access a list of resource identifiers that identify resources that are believed to be benign (or not malicious). Such a list is often referred to as a whitelist. The organization may prevent its internal hosts from accessing any resources not on the whitelist by blocking resource requests that include or are directed to resource identifiers not on the whitelist. In other words, the resources identified by the resource identifiers on the whitelist can be said to be whitelisted.

DETAILED DESCRIPTION

A resource is a data object (i.e., information or a data set or a service via which information or a data set can be accessed), instruction object (i.e., a set of instructions or codes that can be executed or interpreted to cause a physical or virtual processor to perform actions identified in the instruction object or a service providing a set of instructions or codes), or a collection or repository thereof that is accessible to a client via a server. A server is software hosted at a computing system that accepts resource requests (i.e., requests for resources) from clients and provides responses including requested resources to clients. A client is software hosted at a computing system that sends resource requests and receives resources (or data or instruction objects therefrom).

As used herein, the term "resource" refers to a resource abstractly or to any representation of a resource (e.g., difference encodings, presentations, sizes, or other representations). For example, a resource requested at a server can be a webpage, and the resource can be provided to a client as a textual representation (e.g., Hypertext Markup Language (HTML) and JavaScript) of the webpage. As another example, a requested resource can be an image file, and the resource can be provided to a client encoded by a MIME Base64 scheme as a group of ASCII characters. As yet another example, a requested resource can be an instruction object such as a Java® applet that is provided to a client encoded as Java® bytecode. That is, the term resource (referring to the webpage or image file examples) refers to the webpage or image file abstractly and to the specific representations of the webpage or image file provided to the client.

Commonly, entries in a blacklist are discovered in response to a security incident during which malware was identified as originating at for from a malicious (or compromised) resource such as a compromised website. A resource identifier of that resource (e.g., a URL of a webpage of that website) is then added to a blacklist. More comprehensive investigations might uncover sets of resources that are malicious (e.g., providing, hosting, and/or serving malicious content). For example, an organization may analyze (e.g., crawl using a spider or other automated tool) the Internet or a portion thereof to identify websites hosting some specific piece of malware (e.g., a malicious resource to which a resource identifier is included in an email). As another example, resource identifiers of malicious resource may be extracted from a large database of phishing emails.

Such blacklists can be identified by, for example, commercial entities such as virus vendors or public entities such as government agencies. Some such entities often sell (some at significant prices) or provide for free such blacklists, which vary in quality (e.g., have varying numbers of false positives). Typically, organizations construct their own blacklists by downloading all the available blacklists they can find and somehow aggregating them into a blacklist for their own use.

In some instances, resources are identified for inclusion on a whitelist or a blacklist based on static analysis of resource identifiers such as uniform resource identifiers ("URIs"), analysis of resource identifiers at resource identifier registries such as domain name system ("DNS") servers, or analysis of resources themselves. For example, the structure and/or content of a URI such as a uniform resource locator ("URL") of a resource available via the Internet can be analyzed to determine whether the resource identified by the URL is likely to be malicious. As another example, the length of time a URI such as a domain name has been registered with a DNS server, whether requests for that URI are being received by the DNS server at some time, and whether other URIs have been registered with that DNS server by a common client or entity can be analyzed to determine whether the resource identified by that URI is likely malicious. Moreover, resources themselves can be accessed using resource identifiers (e.g., by software hosted at a computing system such as a spider or by an individual using a software agent hosted at a computing system such as an Internet browser) and analyzed to determine whether those resources are malicious. Using these and/or other techniques, organizations can identify malicious resources and/or benign resources for inclusion on blacklists and/or whitelists.

Such approaches to identifying malicious resources often fail to identify many malicious resources (i.e., have high false negative rates) or identify many benign resources as malicious resources (i.e., have high false positive rates). Moreover, such approaches can be computationally expensive. For example, analyzing the structure and/or content of resource identifiers and analyzing resources themselves can include many complex operations that require significant processing, memory, and/or communications capabilities.

Apparatus, systems, and methodologies discussed herein assign security classifications to resources based on measurements of resource requests for those resources. In other words, apparatus, systems, and methodologies discussed herein determine security classifications for resources based on traits or characteristics (e.g., quantities, rates, sources, or combinations thereof) of requests to access those resources. For example, some apparatus, systems, and methodologies discussed herein generate or derive resource access measures based on resource request records representing resource requests. Additionally, some apparatus, systems, and methodologies discussed herein apply a classifier to those resource access measures to assign a security classification (e.g., benign, malicious, unknown, or a probability that a resource is malicious or benign) to each resource. Such approaches can have enhanced performance due to, for example, low computational overhead to generate or derive resource access measures based on resource requests.

Figure 1:
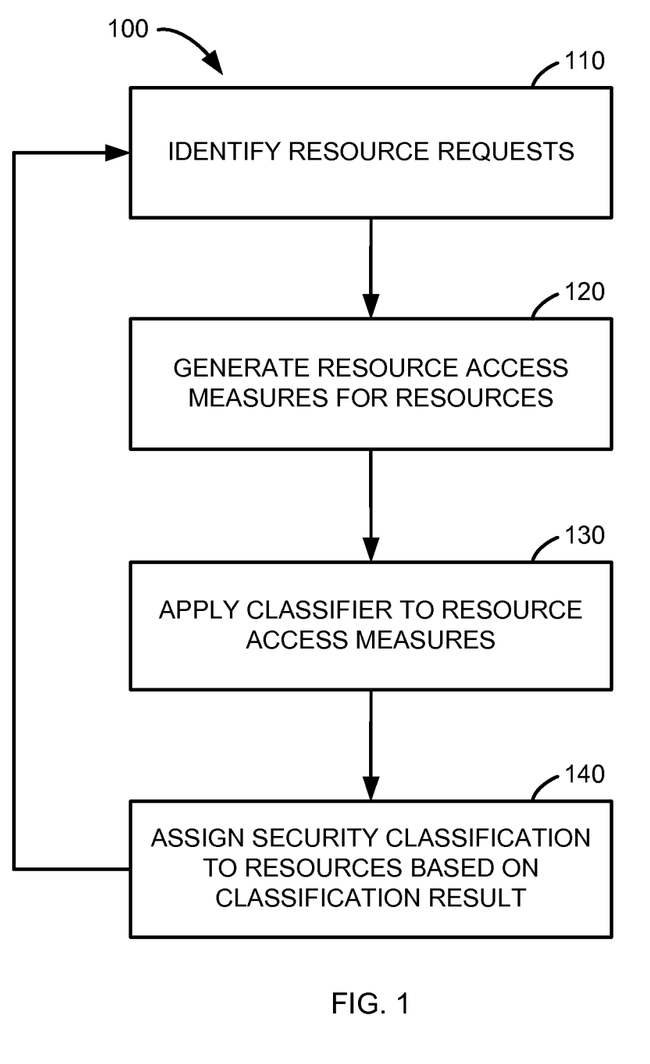
FIG. 1 is a flowchart of a resource classification process, according to an implementation.

FIG. 1 is a flowchart of a resource classification process, according to an implementation. Process 100 can be implemented, for example, at a resource classification system hosted at a computing system. Resource requests are identified at block 110. Resource requests are requests from clients to servers for access to or information about resources. Thus, a resource request can be said to be associated with a resource to which access is requested by that resource request. That is, a resource request can be said to be associated with the resource identified and/or requested by that resource request. For example, a resource request can be a DNS request for an Internet Protocol ("IP") address associated with a resource identifier such as a domain name or other URI. As another example, a resource request can be a Hypertext Transport Protocol ("HTTP") GET, POST, PUT, or other HTTP request. In some implementations, a resource request can be a request to an HTTP proxy for a resource (e.g., including an HTTP request for a resource).

Typically, resource requests include a resource identifier of or for (i.e., that identifies) the resource associated with that resource request. That is, resource requests typically include a resource identifier of the resource to which access is requested by the resource request. For example, an HTTP request typically includes a URL (a resource identifier) of the requested resource. Similarly, DNS requests include a domain name (a resource identifier) for which a network address such as an IP address is requested. The resource request can, therefore, be said to be associated with the resource by a resource identifier of the resource (e.g., a resource identifier of the resource included in the resource request).

Additionally, resource requests often include an identifier of the client of the resource that sent the resource request. In other words, resource requests often include an identifier of the computing system (or host) that sent the resource requests. For example, data packets encapsulating HTTP requests and DNS requests (e.g., IP data packets) typically include a network address (e.g., IP address) of or associated with the client that sent the request. In some implementations, data packets encapsulating HTTP requests and DNS requests can include a physical address of that client. In other implementations, network records such as Dynamic Host Configuration Protocol ("DHCP") records such as DHCP log file entries can be parsed and/or analyzed to determine a device or physical address (e.g., media access control ("MAC") address of a network interface) associated with the network address of that client. In yet other implementations, a name associated with a network address such as "user.corporation.net" can be accessed at a directory or name system of an organization. Such names, network addresses, and physical addresses can be used to identify clients that send resource requests.

Resource requests can be identified from a variety of sources and using a variety of methodologies. For example, resource requests can be identified by accessing resource requests from resource request records. Resource request records are records of resource requests. For example, entries in log files (or logs) of a DNS server, an HTTP proxy server, a gateway, or other resource authority are resource request records. Thus, resource requests can be identified by parsing or reading resource request records at such logs.

As another example, resource requests can be identified by receiving or intercepting resource requests or copies thereof. For example, a router, a switch, a gateway, a resource authority, or client of a resource (or an agent such as software co-hosted at a computing system with the client) can be configured to provide resource requests (or network traffic such as data flows, streams, or packets including resource requests) or copies thereof to a resource classification system implementing process 100. As another example, resource requests can be intercepted at a computing system from which the resource requests were sent (i.e., the computing system at which the resource requests originated). As a specific example, an agent hosted at that computing system (e.g., co-hosted at the computing system with the client) can intercept or collect resource requests such as DNS requests, HTTP requests, or other resource requests (or copies thereof) originating at that computing system. In other words, a router, a switch, a gateway, a resource authority, or an agent can be configured to forward resource requests or copies thereof to a resource classification system implementing process 100. As yet another example, resource requests can be intercepted at a communications link such as an electrical or optical cable.

Resource access measures for a group of resources are then generated at block 120 from the resource requests identified at block 110. A resource access measure is a value that describes access traits or characteristics of a resource, and can be said to be associated with that resource. In some implementations, a resource access measure is generated at block 120 for each resource identified at block 110. In other implementations, a group of resource access measures is generated at block 120 for each resource identified by a resource identifier in resource requests from the resource requests identified at block 110.

For example, a resource access measure can be a value that represents the number of unique clients (or hosts) that have requested access to a resource (i.e., the number of unique clients that have sent resource requests identified at block 110 to that resource). This resource access measure can be generated for each resource by determining an identifier of the client (e.g., a network address or physical address as discussed above) that sent each resource request identified at block 110 to that resource, and counting the unique identifiers of such clients at the resource classification system implementing process 100.

As another example, a resource access measure can be a value that represents the total number of resource requests identified at block 110 that are directed to (or associated with) a resource. This resource access measure can be generated for each resource by counting the resource requests identified at block 110 that were directed to that resource.

As yet another example, a resource access measure can be an access measure for a sub-resource of a resource. A sub-resource of a resource is another resource that is within or accessible at or via the resource. Such resource access measures can be referred to as sub-resource access measures of the resource. As discussed above, in some implementations a resource is a collection or repository of resources. In such implementations, the collection or repository can be referred to as the resource, and the resources included within the collection or repository can be referred to as sub-resources of that resource. Thus, the sub-resource access measures of a resource describe access traits or characteristics of the sub-resources of that resource. Moreover, in some implementations, sub-resources can have sub-resources. For example, a sub-resource can be a collection or repository of resources (i.e., sub-resources of that sub-resource).

As a specific example of sub-resources of a resource, a domain (identified by a resource identifier such as a domain name) can be a resource and webpages or other objects accessible via that domain can be sub-resources of that domain. Thus, for the following URL, domain.com is the resource identifier of the resource (here, a domain), and "page.html" is the resource identifier of the sub-resource (here, a webpage): domain.com/page.html. Alternatively, "domain.com/page.html" can be referred to as the resource identifier or the fully-qualified resource identifier of the sub-resource. As another example, for the following URL, domain.com is the resource identifier of the resource (here, a domain), and "resource" is the resource identifier of the sub-resource (here, a webpage): resources.domain.com. Alternatively, "resources.domain.com" can be referred to as the resource identifier or the fully-qualified resource identifier of the sub-resource.

As an example of a sub-resource access measure of a resource, a sub-resource access measure can be a value that represents the total number of resource requests identified at block 110 that are directed to (or associated with) a sub-resource of the resource. In some implementations, a group of resource access measures of a resource can be generated at block 120 that includes a value that represents the total number of resource requests identified at block 110 that are directed to (or associated with) the resource and a group of values, each of which represents the total number of resource requests identified at block 110 that are directed to (or associated with) a sub-resource of the resource.

As other examples, resource access measures can be ratios of other resource access measures or values derived from the resource requests identified at block 110. For example, a resource access measure can be a ratio of the number of the resource requests identified at block 110 that are directed to a particular resource to the total number of the resource requests identified at block 110. As yet another example, a resource access measure can be an average number of resource requests for a resource per client of that resource. In yet other implementations, other values that describe access traits or characteristics of resources can be resource access measures.

A classifier is then applied to the resource access measures for the resources at block 130 to generate a classification result for each resource. The classifier can be any of a variety of classifiers, and is trained using resource access measures for resources with known security classifications. For example, the classifier can be a decision tree classifier, a random forest classifier, a support vector machine classifier, or some other classifier. The classification result is an indication of a class in which the classifier has classified each resource based on the resource access measures. As an example, the classification result can indicate a degree to which one resource is similar to or different from other resources with known security classifications based on resource access measures of those resources. In other implementations, the classification result can indicate to which group of resources with known security classifications one resource is similar to or different from based on resource access measures of those resources.

In some implementations, resource access measures are selected for generation at block 120 based on heuristics related to the strength of discrimination such resource access measures provide for the classifier applied at block 130. Said differently, resource access measures generated at block 120 can differ significantly for resources that should be assigned different security classifications and have significant similarities for resources that should be assigned a common (or similar) security classification.

For example, a resource access measure that represents the number of unique clients that have requested access to a resource can be generated at block 120 because a malicious resource is typically accessed by few clients in comparison to the number of clients that access benign resources. Similarly, a resource access measure that represents the total number of resource requests identified at block 110 that are directed to a resource can be generated at block 120 because a malicious resource typically receives substantially fewer resource requests than the number of resource requests received by benign resources. As yet another example, a resource access measure that represents the number of unique (or distinct) sub-resources accessed at a resource and/or a group of resource access measures that represent the number of resource requests to each unique sub-resource of a resource can be generated at block 120 because fewer unique sub-resources are typically accessed at malicious resources than are accessed at benign resources.

In some implementations, a single classifier is applied to each resource access measure at block 130. In other words, multiple resource access measures can be input to the classifier at block 130. Said yet another way, multiple resource access measures can be the features of the classifier. In other implementations, the classifier is a group of classifiers, and each classifier from the group of classifiers is applied to a unique resource access measure from the group of resource access measures generated at block 120. In yet other implementations, the classifier is a group of classifiers, and one or more resource access measures can be input to each classifier from the group of classifiers at block 130. The outputs of the group of classifiers can then be combined to define a classification result.

After the classifier is applied to the resource access measures at block 130, a security classification is then assigned to each resource based on the classification result from the classifier at block 140. In some implementations, the classification result is the security classification, and the classification result for each resource is assigned to that resource. In other implementations, the classification result for each resource is a percentage, a confidence value, or an abstract value that represents a degree of similarity or dissimilarity with other resources based on resource access measures for those resources, and the security classifications are assigned based on ranges or distinct values of classification results.

For example, if the classification result indicates that a resource is similar to known malicious resources based on the resource access measures for those resources, a security classification that indicates a resource is likely malicious can be assigned to that resource. As another example, if the classification result indicates that a resource is similar to known malicious resources based on the resource access measures for those resources, a security classification that indicates the degree to which that resource is similar to those resources can be assigned to that resource to indicate a likelihood that that resource is malicious. Alternatively, the security classification can be assigned at block 140 based on the similarity of a resource to resources that are known to be benign.

A security classification is a value that describes an extent to which a resource is or is believed or determined to be malicious or benign. For example, a security classification can be a value between 0 and 10 (or between 0 and 1 for a probability of likelihood value) that indicates a confidence that a resource is malicious. As another example, a security classification can be a value between 0 and 100 (or between 0 and 1 for a probability of likelihood value) that indicates a confidence that a resource is benign. As yet another example, security classifications can have values of white, gray, and black.

In this example, the white security classification indicates that a resource is (or has been determined to be) likely benign (or unlikely to be malicious). For example, a resource to which a white security classification result is assigned can be considered a benign resource. The black security classification indicates that a resource is (or has been determined to be) likely malicious (or unlikely to be benign). For example, a resource to which a black security classification result is assigned can be considered a malicious resource. The gray security classification indicates that a resource is (or has been determined to be) possibly malicious or benign. For example, a resource to which a gray security classification result is assigned can be considered a potentially malicious resource or a resource that cannot be confirmed as at malicious or benign. In other implementations, a gray security classification indicates that it is (or has been determined to be) unknown whether a resource is benign or malicious. In some implementations, a gray security classification can indicate a, for example, 0.5 likelihood that the resource is malicious.

The security classifications assigned to resources at block 140 can, in some implementations, then be used to generate blacklists and/or whitelists. For example, resources to which security classifications were assigned at block 140 that indicate a high likelihood that a resource is malicious can be added to a blacklist. Similarly, for example, resources to which security classifications were assigned at block 140 that indicate a high likelihood that a resource is benign (or a low likelihood that a resource is malicious) can be added to a whitelist.

As illustrated in FIG. 1, in some implementations, process 100 returns to block 110 after completing block 140 to identify additional resource requests and assign new or updated security classifications to resources. In other words, process 100 can be repeated periodically or continuously to assign new or updated security classifications to resources.

Moreover, process 100 illustrated in FIG. 1 is an example implementation of a resource classification process. In other implementations, a resource classification process can include additional, fewer, or different blocks (or steps) than illustrated in FIG. 1. For example, in some implementations, a resource classification process includes steps at which a classifier is trained using resource access measures generated at block 120 for resources with known security classifications. Such implementations can be useful to generate blacklists and/or whitelists that are specific to an organization.

For example, the resource requests identified at block 110 can originate within a common organization such as an enterprise intra-network. As a specific example, the resource requests identified at block 110 can be identified by accessing the organization's resource request records such as DNS logs and HTTP proxy logs. The classifier can then be trained using resource access measures generated at block 120 for resources with known security classifications, and applied to the resource access measures for the remaining resources. Security classifications can then be applied to the remaining resources at block 140, and blacklists and/or whitelists then generated based on those security classifications. Because the classifier was trained based on resource requests from within the organization, the classifier and the resulting classification results and security classifications are specific to the organization. Accordingly, the blacklists and/or whitelists generated from the security classifications can have enhanced specificity, accuracy, and/or precision for the organization as compared to blacklists and/or whitelists generated using data from outside the organization.

Figure 2:
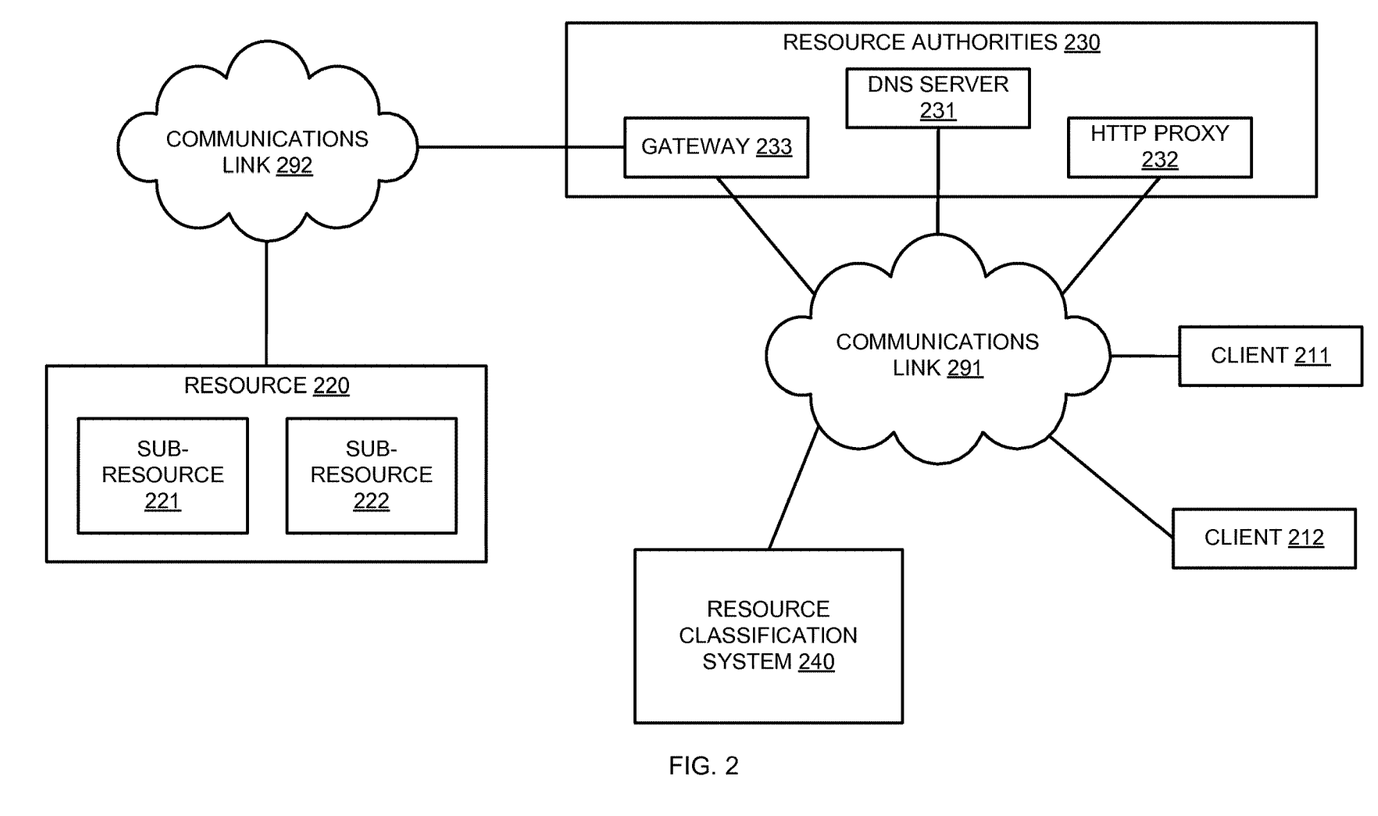
FIG. 2 is a schematic block diagram of an environment including a resource classification system, according to an implementation.

FIG. 2 is a schematic block diagram of an environment including a resource classification system, according to an implementation. The environment illustrated in FIG. 2 includes client 211, client 212, resource authorities 230, resource classification system 240, communications link 292, and resource 220. In the example illustrated in FIG. 2, clients 211 and 212 communicate with resource 220 via communications link 291, resource authorities 230, and communications link 292.

Communications link 291 includes devices, services, or combinations thereof that define communications paths between clients 211 and 212, resource authorities 230, resource classification system 240, and/or other devices or services. For example, communications link 291 can include one or more of a cable (e.g., twisted-pair cable, coaxial cable, or fiber optic cable), a wireless link (e.g., radio-frequency link, indicative link, optical link, or sonic link), or any other connectors or systems that transmit or support transmission of signals. Moreover, communications link 291 can include communications networks such as a switch fabric, an intranet, the Internet, telecommunications networks, or a combination thereof. Additionally, communications link 291 can include proxies, routers, switches, gateways, bridges, load balancers, and similar communications devices. Furthermore, the connections or communications paths illustrated in FIG. 2 and discussed herein can be logical or physical. Thus, for example, resource classification system 240 may not be physically connected to communications link 291, but may be accessible via communications link 291 and a server and/or additional communications links. Communications link 292 is similar to communications link 291, but includes devices, services, or combinations thereof that define communications paths between gateway 233 resource 220, and/or other devices or services.

Resource authorities 230 are modules at which clients 211 and 212 can access information related to resource 220 and, typically, other resources (not shown) and/or via which clients 211 and 212 can access resource 220 and, typically, other resources (not shown). As examples, as illustrated in FIG. 2, DNS server 231 is a resource authority, HTTP proxy 232 is a resource authority, and gateway 233 is a resource authority. In this example, resource classification system 240 accesses resource request records at DNS server 231 and HTTP proxy 232, and gateway 233 provides access to resource 220 via communications link 292 for entities in communication with communications link 291 (e.g., HTTP proxy 232, DNS server 231, and clients 211 and 212).

As a specific example, a resource identifier (e.g., a URL) of sub-resource 221 of resource 220 is provided to client 211 (e.g., by a user selecting a link within a webpage). Client 211 determines a network address of sub-resource 221 (or of a computing device hosting sub-resource 221) by providing a DNS request (a resource request) to DNS server 231 via communications link 291. DNS server 231 accepts the DNS request and provides a DNS response including a network address of sub-resource 221 to client 211 via communications link 291. Client 211 then provides an HTTP request to sub-resource 221 via communications link 291, gateway 233, and communications link 292. In other words, client 211 sends a resource request (the HTTP request) to sub-resource 221 to sub-resource 221 via communications link 291, gateway 233, and communications link 292.

Similarly, Client 212 determines a network address of sub-resource 222 by providing a DNS request (a resource request) to DNS server 231 via communications link 291. DNS server 231 accepts the DNS request and provides a DNS response including a network address of sub-resource 222 to client 212 via communications link 291. Client 212 then provides an HTTP proxy request for sub-resource 222 to HTTP proxy 232 via communications link 291, and HTTP proxy 232 forwards that resource request (the HTTP request) to sub-resource 222 via communications link 291, gateway 233, and communications link 292. In other words, client 212 sends a resource request (the HTTP request) to sub-resource 222 via HTTP proxy 232.

Resource classification system 240 identifies those resource requests based on information provided to resource classification system 240 from DNS server 231, HTTP proxy 232, and/or resource request records generated by resource classification system 240 from DNS server 231 and/or HTTP proxy 232. For example, resource classification system 240 can access logs of DNS server 231 and/or HTTP proxy 232 (e.g., via communications link 291), and perform a process similar to process 100 or process 400, for example, to assign security classifications to resource 220, sub-resource 221, and/or sub-resource 222. Alternatively, for example, agents co-hosted with clients 211 and 212 can send information about resource requests sent from clients 211 and 212 to resource classification system 240.

Figure 3:
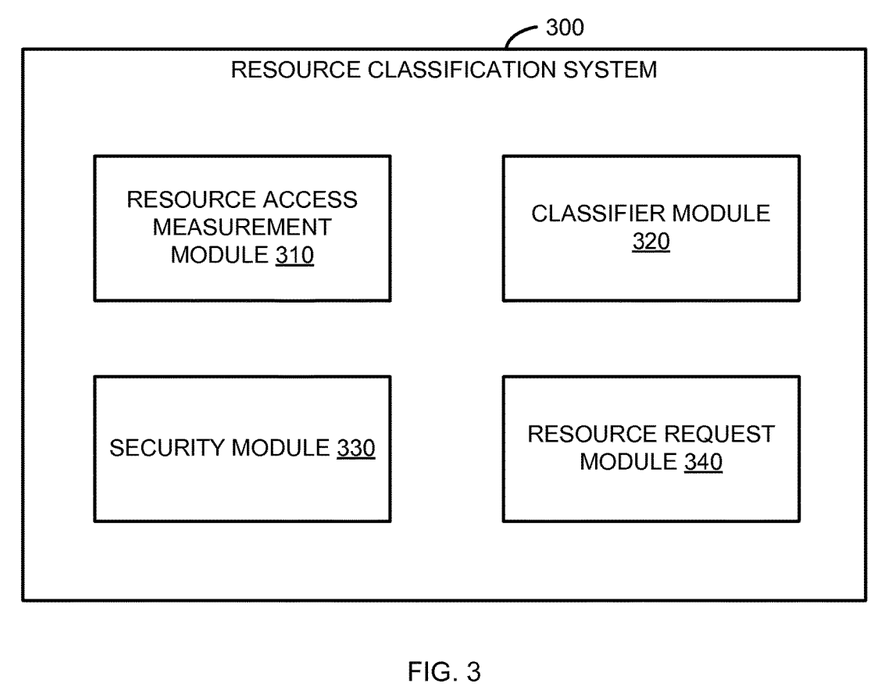
FIG. 3 is a schematic block diagram of a resource classification system, according to an implementation.

FIG. 3 is a schematic block diagram of a resource classification system, according to an implementation. Although particular modules (i.e., combinations of hardware and software) are illustrated and discussed in relation to FIG. 3 and other example implementations, other combinations or sub-combinations of modules can be included within other implementations. Said differently, although modules illustrated in FIG. 3 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules. Moreover, a module discussed herein in relation to a particular type of module can be implemented as a different type of module in other implementations. For example, a security module can be implemented using a group of electronic and/or optical circuits (or circuitry) rather than as instructions stored at memory and executed at a processor.

In the example illustrated in FIG. 3, resource classification system 300 includes resource access measurement module 310, classifier module 320, security module 330, and resource request module 340. Resource classification module 300 is a module (i.e., a combination of hardware and software) that generates resource access measurements for resources based on resource requests. For example, resource classification module 310 can be a an application-specific integrated processor (ASIC) processor executing instructions to implement block 120 discussed above in relation to FIG. 1, or performing similar functionalities to generate resource access measurements. Moreover, as discussed in more detail below, in some implementations, resource classification module 310 updates resource access measurements for resources based on resource requests.

Classifier module 320 is a module (i.e., a combination of hardware and software) that applies a classifier to resource access measurements for resources to generate classification results for those resources. For example, classifier module 320 can be an ASIC or a processor executing instructions to implement block 130 discussed above in relation to FIG. 1, or performing similar functionalities to apply a classifier to resource access measurements for resources. Moreover, in some implementations, classifier module 320 defines and/or modifies a classifier based on resource access measurements for resources having known security classifications. In other words, resource access measurements for resources and security classifications of those resource access measurements can be provided to classifier module 320, and classifier module 320 defines and/or modifies classifiers using those resource access measurements for resources and security classifications of those resources. Such implementations are discussed in more detail below in relation to, for example, FIG. 4.

Security module 330 is a module (i.e., a combination of hardware and software) that assigns security classifications to resources based on classification results for those resources output from classifier module 320. For example, security module 330 can be an ASIC or a processor executing instructions to implement block 140 discussed above in relation to FIG. 1, or performing similar functionalities to assign security classifications to resources. As an example, security module 330 can include, access, or derive from resource requests identified by resource request module 340 a list of resource identifiers associated with resources, and can associate a security classification with each resource identifier based on a classification result for each resource identified by the resource requests. As a specific example, the list of resource identifiers and security classifications can be associated within a relational database or a table in a memory of a computing device. That is, security module 330 can include or can communicate with, for example, a relational database to establish associations between resource identifiers and security classifications.

Resource request module 340 is a module (i.e., a combination of hardware and software) that identifies resource requests. For example, resource request module 340 can be an ASIC or a processor executing instructions to implement block 110 discussed above in relation to FIG. 1, or performing similar functionalities to assign identify resource requests. For example, resource request module 340 can communicate with agents co-hosted with clients of resources or resource authorities to receive resource requests sent from or received at clients of resources or resource authorities, respectively. In other implementations, resource request module 340 can access resource request records generated at resource authorities (e.g., logs of resource authorities) to identify resource requests.

Figure 4:
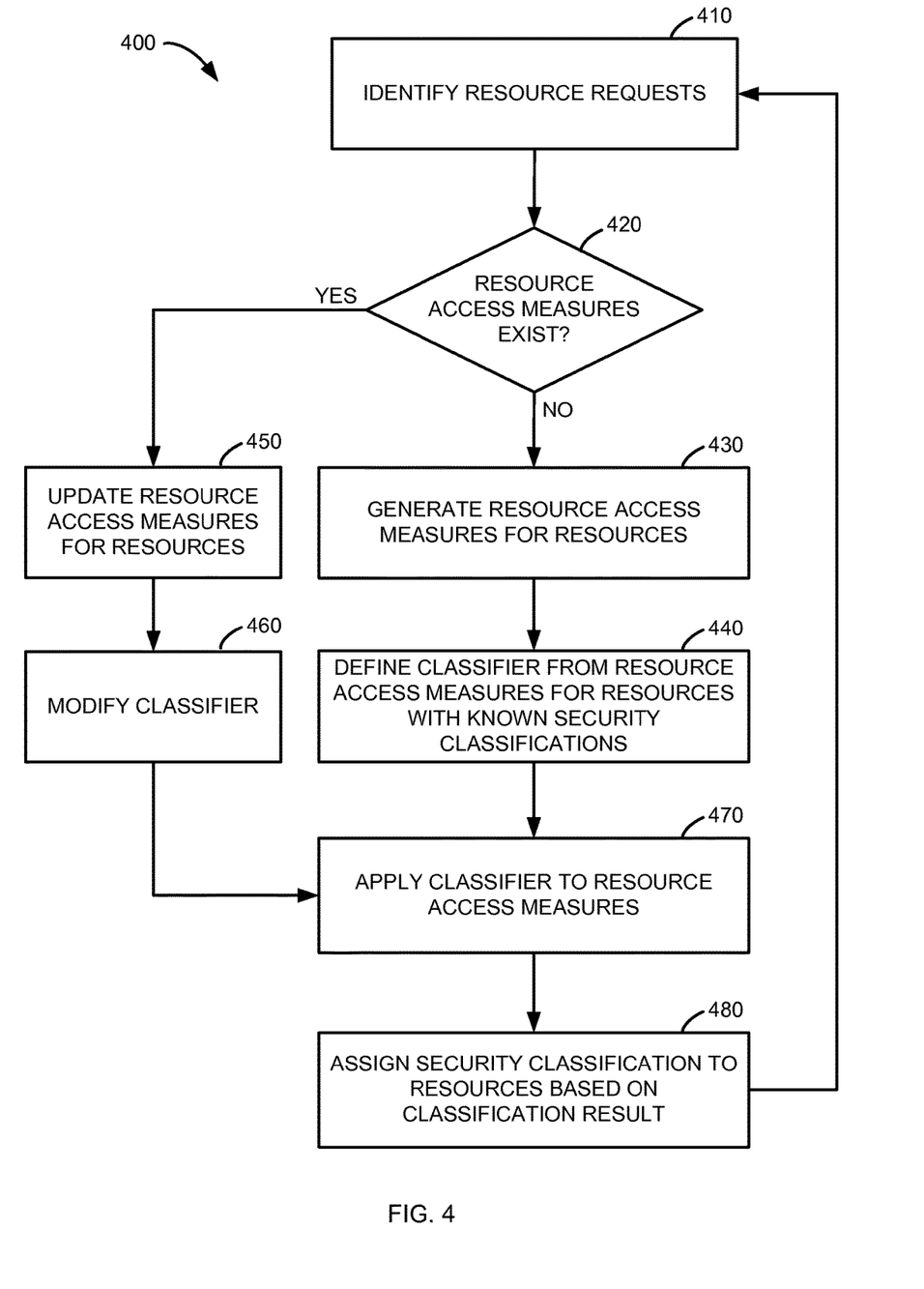
FIG. 4 is a flowchart of a resource classification process, according to another implementation.

FIG. 4 is a flowchart of a resource classification process, according to another implementation. Similar to process 100 discussed above in relation to FIG. 1, process 400 can be implemented at a resource classification system such as a resource classification system hosted at a computing system. Resources requests are identified at block 410, and a determination is made at block 420 regarding whether resource access measures for the resources associated with the resource requests identified at block 410 exist (or have been previously generated). If those resource access measures do not exist (or have not been previously generated), process 400 proceeds to block 430 at which resource access measures are generated for resources. For example, as discussed above in relation to FIG. 1, a variety of resource access measures can be generated for resources using a variety of methodologies.

Process 400 then proceeds to block 440 at which a classifier is defined from resource access measures generated to block 430 with known security classifications. For example, a resource access measure or a group of resource access measures can be selected from the resource access measures generated at block 430 because they are associated with or for resources that are known or believed (e.g., determined to be) malicious or benign with some likelihood or probability. As a specific example, resource access measures for resources that are known (or assumed or believed) to be benign (e.g., webpages, websites, or domains that are trusted to not be malicious) and/or resource access measures for resources that are known to be malicious (e.g., webpages, websites, or domains that are known to be malicious) can be selected from resource access measures generated to block 430. Such resources (or associated resource identifiers) and their security classifications can be referred to as ground truth for a classifier.

The selected resources (or resource identifiers that identify those resources) and their security classifications are then provided to a security module to generate a classifier. For example, resource identifiers of the selected identifiers and their security classifications are provided as training date for a classifier such as a decision tree, a random forest, a support vector machine, or some other classifier.

As discussed above, in some implementations, resource requests are identified at block 410 within an organization (e.g., at resource authorities of or within an enterprise network). Accordingly, in such implementations, the classifier can be said to be trained to resource access patterns of that organization. Accordingly, the classifier can be specific to that organization because it is trained using resource requests generated within that organization.

The classifier defined at block 440 is then applied to the resource access measures generated at block 430 to generate a classification result at block 470. In some implementations, the classifier is applied at block 470 to the resource access measures generated at block 430 that were not selected or used at block 440 to define the classifier (e.g., resource access measures generated at block 430 for resources that do not have known security classifications), but not to the resource access measures selected or used at block 440.

As discussed above in relation to process 100 of FIG. 1, security classifications are applied to resources with which resource requests identified at block 410 are associated based on the classification result from block 470 at block 480. Similar to block 470, in some implementations, security classifications are applied to the resources that do not have known security classifications at block 480 based on the classification result from block 470.

Process 400 proceeds from block 480 to 410 to identify additional resource requests such as resource requests that were sent from clients to resources after resource requests were previously identified at block 410. Referring again to block 420, if resource access measures have previously been defined for resources associated with the resource requests identified at block 410 (e.g., a resource classification system implementing process 400 has previously executed blocks 430, 440, 470, and 480), process 400 proceeds to block 450. At block 450, resource access measures are updated based on resource requests identified at block 410. In other words, rather than generate new resource access measures for resources, previously generated resource access measures for resources are updated or changed based on resource requests received after the resource access measures were generated or previously updated to reflect the previously identified resource requests and newly identified resource requests. For example, counts of the number of clients accessing (or sending resource requests to) a resource can be increased based on newly identified resource requests, ratios and/or averages can be changed based on newly identified resource requests, and/or counts of the number of resource requests provided to resources can increased based on newly identified resource requests.

Because the resource access measures are updated rather than newly generated in such implementations, historical and current information about the resource access measures for resources is considered by apparatus, systems, and methods implementing process 400. Such implementations can therefore adapt and conform to a particular organization. As a result, such resource access measures can accurately reflect resource access patterns within that organization.

In the implementation illustrated in FIG. 4, the classifier defined at block 440 is modified at block 460 based on the updated resource access measures for resources with known security classifications. For example, the classifier can be retrained using the updated resource access measures for resources with known security classifications and those security classifications. In some implementations, the classifier is re-defined at block 460 using the updated resource access measures for resources with known security classifications and those security classifications. In other words, block 460 discards or clears the classifier and performs functionalities similar to block 440 to re-define the classifier using the updated resource access measures for resources with known security classifications and those security classifications.

In other implementations, the classifier is modified at block 460 by providing the updated resource access measures for resources with known security classifications and those security classifications as additional training data to the classifier. That is, the updated resource access measures for resources with known security classifications and those security classifications can be provided to the classifier (or to a classifier module that defines or updates classifiers) similarly as discussed in relation to block 440, but the classifier is not first discarded or cleared. Thus, the classifier can adapt as resource access measures are updated.

Process 400 then proceeds to block 470 at which the modified classifier is applied to the resource access measures updated at block 450 similarly as discussed above in relation to block 470 to generate a classification result for each resource, and a security classification is assigned to each resource based on the classification result for that resource.

As discussed, above, process 400 can then proceed to block 410 to identify additional or new resource requests.

Process 400 illustrated in FIG. 4 is an example implementation of a resource classification process. In other implementations, a resource classification process can include additional, fewer, or different blocks (or steps) than illustrated in FIG. 4. For example, in some implementations, multiple classifiers are defined and/or modified by a resource classification process.

As a specific example, multiple resource access measures can be generated for each resource. A first group of the resource access measures for each resource can be related one with another (e.g., of a first type or class) and a second group (or subsequent groups) of resource access measures can be related one with another (e.g., of a second type or class). A classifier can be defined and/or modified for each group as discussed above using resource access measures of each group for resources with known security classifications. Each classifier can be applied to the group of resource access measures from which it was defined and/or modified to generate multiple classification results for each resource. The multiple classification results can then be used to assign a security classification to each resource. For example, the classification results for each resource can be aggregated (e.g., averaged or weight averaged) to determine an aggregate classification result for that resource that is used to assign a security classification to that resource. As another example, the classification results for each resource can be combined into a vector that is compared with similarly formed vectors based on the classification results for resources with known security classifications to determine a distance or difference between that vector and those vectors. That resource can be assigned the same security classification as the resource with the vector from the vectors to which that vector (i.e., the vector for that resource) is closest or least different.

Figure 5:
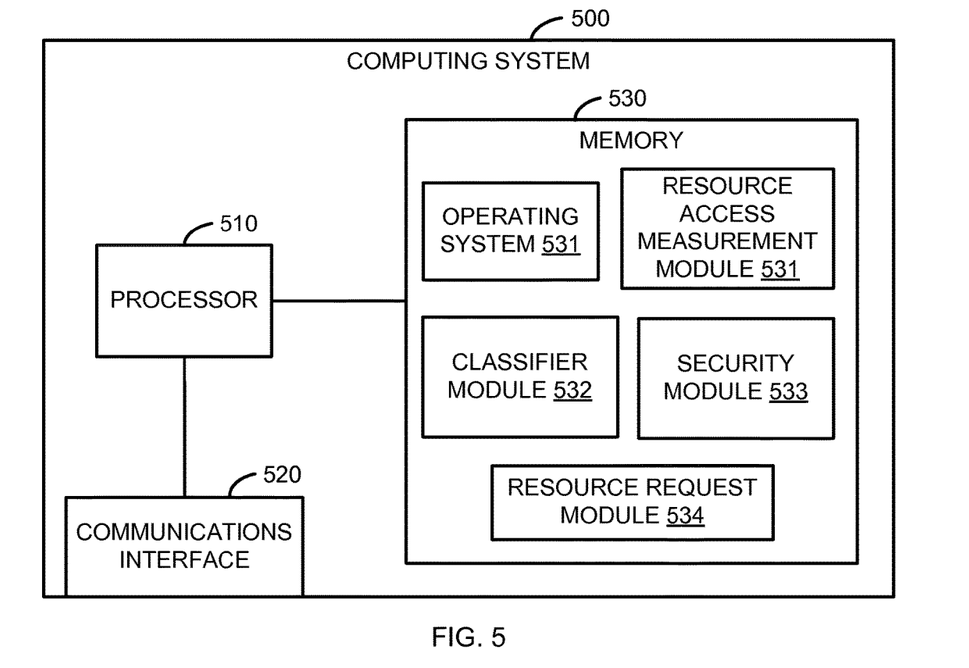
FIG. 5 is a schematic block diagram of a computing system hosting a resource classification system, according to an implementation.

FIG. 5 is a schematic block diagram of a computing system hosting a resource classification system, according to an implementation. In the example illustrated in FIG. 5, computing system 500 includes processor 510, communications interface 520, and memory 530. Computing system 500 can be, for example, a personal computer such as a desktop computer or a notebook computer, a tablet device, a smartphone, a distributed computing system (e.g., a group, grid, or cluster of individual computing systems), or some other computing system. In some implementations, a computing system hosting a resource classification system is referred to itself as a resource classification system.

Processor 510 is any combination of hardware and software that executes or interprets instructions, codes, or signals. For example, processor 510 can be a microprocessor, an application-specific integrated circuit (ASIC), a graphics processing unit (GPU) such as a general purpose GPU (GPGPU), a distributed processor such as a cluster or network of processors or computing systems, a multi-core or multi-processor processor, or a virtual or logical processor of a virtual machine.

Communications interface 520 is a module via which processor 510 can communicate with other processors or computing systems via a communications link. As a specific example, communications interface 520 can include a network interface card and a communications protocol stack hosted at processor 510 (e.g., instructions or code stored at memory 530 and executed or interpreted at processor 510 to implement a network protocol) to receive data from and send data to resource authorities. As specific examples, communications interface 520 can be a wired interface, a wireless interface, an Ethernet interface, a Fiber Channel interface, an InfiniBand interface, an IEEE 802.11 interface, or some other communications interface via which processor 510 can exchange signals or symbols representing data to communicate with other processors or computing systems.

Memory 530 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 530 can be a volatile random access memory (RAM), a persistent data store such as a hard-disk drive or a solid-state drive, a compact disc (CD), a digital versatile disc (DVD), a Secure Digital™ (SD) card, a MultiMediaCard (MMC) card, a CompactFlash™ (CF) card, or a combination thereof or of other memories. In other words, memory 530 can represent multiple processor-readable media. In some implementations, memory 530 can be integrated with processor 510, separate from processor 510, or external to computing system 500.

Memory 530 includes instructions or codes that when executed at processor 510 implement operating system 531 and other modules. In other words, instructions or codes stored at memory 530 can be referred to as modules. Memory 530 is also operable to store additional codes or instructions to implement other modules not illustrated in FIG. 5 and/or other data sets such as resource access records.

Specifically as illustrated in FIG. 5, computing system 500 includes resource access measurement module 531 (e.g., instructions or codes stored at memory 530 that when executed or interpreted at processor 510 perform functions of a resource classification system as discussed herein), classifier module 532 (e.g., instructions or codes stored at memory 530 that when executed or interpreted at processor 510 perform functions of a resource classification system as discussed herein), security module 533 (e.g., instructions or codes stored at memory 530 that when executed or interpreted at processor 510 perform functions of a resource classification system as discussed herein), and resource request module 534 (e.g., instructions or codes stored at memory 530 that when executed or interpreted at processor 510 perform functions of a resource classification system as discussed herein). Resource access measurement module 531, classifier module 532, security module 533, resource request module 534, and other modules (not shown) that perform functionalities of a resource classification system as discussed herein can be referred to as components of a resource classification system.

In some implementations, computing system 500 can be a virtualized computing system. For example, computing system 500 can be hosted as a virtual machine at a computing server. Moreover, in some implementations, computing system 500 can be a computing appliance or virtualized computing appliance, and operating system 531 is a minimal or just-enough operating system to support (e.g., provide services such as a communications protocol stack and access to components of computing system 500 such as communications interface 520) a resource classification system. In yet other implementations, computing system 500 can be, for example, a router, network switch, or other device that performs functionalities in addition to functionalities related to a resource classification system.

A resource classification system including resource access measurement module 531, classifier module 532, security module 533, and resource request module 534 can be accessed or installed at computing system 500 from a variety of memories or processor-readable media. For example, computing system 500 can access that resource classification system at a remote processor-readable medium via a communications interface (not shown). As a specific example, computing system 510 can be a network-boot device that accesses operating system 531 and components of that resource classification system during a boot process (or sequence).

As another example, computing system 500 can include (not illustrated in FIG. 5) a processor-readable medium access device (e.g., CD, DVD, SD, MMC, or a CF drive or reader), and can access components of that resource classification system at a processor-readable medium via that processor-readable medium access device. As a more specific example, the processor-readable medium access device can be a DVD drive at which a DVD including an installation package for one or more components of that resource classification system are accessible. The installation package can be executed or interpreted at processor 510 to install one or more components of that resource classification system at computing system 500 (e.g., at memory 530 and/or at another processor-readable medium such as a hard-disk drive). Computing system 500 can then host or execute that resource classification system.

In some implementations, that resource classification system (or components such as various modules thereof) can be accessed at or installed from multiple sources, locations, or resources. For example, some components of that resource classification system can be installed via a communications link (e.g., from a file server accessible via a communication link and communications interface 520), and other components of that resource classification system can be installed from a DVD.

In other implementations, components of that resource classification system can be distributed across multiple computing systems. That is, some components of that resource classification system can be hosted at one computing system and other components of that resource classification system can be hosted at another computing system.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or components in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements such as an ASIC), software hosted at hardware (e.g., software that is stored at a memory such as RAM, a hard-disk or solid-state drive, resistive memory, or optical media such as a DVD and/or executed or interpreted at a processor), or hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Moreover, the term "provide" as used herein includes push mechanisms (e.g., sending data to a computing system or agent via a communications path or channel), pull mechanisms (e.g., delivering data to a computing system or agent in response to a request from the computing system or agent), and store mechanisms (e.g., storing data at a data store or service at which a computing system or agent can access the data). Furthermore, as used herein, the term "based on" means "based at least in part on." Thus, a feature that is described as based on some cause, can be based only on the cause, or based on that cause and on one or more other causes.

What is claimed is:

1. A processor-readable medium storing code representing instructions that when executed by a processor cause the processor to:
   identify a plurality of resource requests, each resource request from the plurality of resource requests associated with a resource from a plurality of resources by a resource identifier of that resource;
   determine whether a plurality of resource access measures were previously generated for the plurality of resource requests;
   update the plurality of resource access measures based on the plurality of resource requests responsive to the determination that the plurality of resource access measures were previously generated, wherein a classifier for the previously generated plurality of resource access measures is modified and utilized as the classifier for the resource access measures;
   generate the plurality of resource access measures based on the plurality of resource requests responsive to the determination that the plurality of resource access measures were not previously generated for the plurality of resource requests, and define a new classifier from the plurality of generated resource access measures to be utilized as the classifier for the resource access measures, wherein each resource access measure from the plurality of resource access measures is associated with the resource from the plurality of resources, and each resource access measure is a value that describes an average number of resource requests associated with the plurality of resource requests;
   apply the classifier for the resource access measures to each resource access measure from the plurality of resource access measures to generate a classification result for the resource from the plurality of resources associated with that resource access measure; and
   assign a security classification to each resource from the plurality of resources based on the classification result for that resource.

2. The processor-readable medium of claim 1, wherein the plurality of resource requests include Domain Name System requests and Hypertext Transfer Protocol requests.

3. The processor-readable medium of claim 1, wherein
   the plurality of resource requests is a first plurality of resource requests,
   the plurality of resource access measures is generated at a first time, and the security classification assigned to each resource from the plurality of resources is a first security classification assigned to that resource before a second time, the processor-readable medium further storing code representing instructions that when executed at the processor cause the processor to:

update, at the second time after the first time, the plurality of resource access measures based on a second plurality of resource requests and not based on the first plurality of resource requests;

apply, after the second time, the classifier for the resource access measures to each resource access measure from the plurality of resource access measures; and assign a second security classification to each resource from the plurality of resources based on a classification result from application of the classifier for the resource access measures, after the second time, to the resource access measure from the plurality of resource access measures associated with that resource.

4. The processor-readable medium of claim 1, wherein the plurality of resource requests is a first plurality of resource requests, the plurality of resource access measures is generated at a first time, and the security classification assigned to each resource from the plurality of resources is a first security classification assigned to that resource before a second time, the processor-readable medium further storing code representing instructions that when executed at the processor cause the processor to:

update, at the second time after the first time, the plurality of resource access measures based on a second plurality of resource requests and not based on the first plurality of resource requests;

modify the classifier for the resource access measures using resource access measures from the plurality of resource access measures associated with resources from the plurality of resources having known security classifications;

apply, after the second time, the classifier for the resource access measures to each resource access measure from the plurality of resource access measures; and assign a second security classification to each resource from the plurality of resources based on a classification result from application of the classifier for the resource access measures, after the second time, to the resource access measure from the plurality of resource access measures associated with that resource.

5. The processor-readable medium of claim 1, wherein the code representing instructions that when executed at the processor cause the processor to generate the plurality of resource access measures includes code representing instructions that when executed at the processor cause the processor to:

determine a sub-resource access measure for that resource from the plurality of resource requests.

6. The processor-readable medium of claim 1, wherein the code representing instructions that when executed at the processor cause the processor to generate the plurality of resource access measures includes code representing instructions that when executed at the processor cause the processor to:

determine a host access measure for that resource, a group access measure for that resource, a sub-resource access measure for that resource, or a combination thereof from the plurality of resource requests.

7. A resource classification method, comprising:

accessing a plurality of resource request records representing resource requests for a plurality of resources, each resource request record from the plurality of resource request records associated with a resource from the plurality of resources by a resource identifier of that resource;

determining whether a plurality of resource access measures were previously generated for the plurality of resource request records;

updating the plurality of resource access measures based on the plurality of resource request records responsive to the determination that the plurality of resource access measures were previously generated, wherein a classifier for the previously generated plurality of resource access measures is modified and utilized as the classifier for the resource access measures;

generating the plurality of resource access measures from the resource request records for each resource from the plurality of resources responsive to the determination that the plurality of resource access measures were not previously generated for the plurality of resource request records, and define a new classifier from the plurality of generated resource access measures to be utilized as the classifier for the resource access measures, wherein each resource access measure is a value that describes a ratio of a number of the resource request records associated with the plurality of resource request records;

applying the classifier for the resource access measures to the plurality of resource access measures for each resource from the plurality of resources; and assigning a security classification to the plurality of resources for each resource from the plurality of resources based on a classification result from application of the classifier for the resource access measures to the plurality of resource access measures associated with that resource.

8. The method of claim 7, wherein:

the plurality of resource request records include Domain Name System request records and Hypertext Transfer Protocol request records.

9. The method of claim 7, wherein generating the plurality of resource access measures from the resource request records for each resource from the plurality of resources includes determining a sub-resource access measure for that resource.

10. The method of claim 7, wherein generating the plurality of resource access measures from the resource request records for each resource from the plurality of resources includes determining a host access measure for that resource, a group access measure for that resource, a sub-resource access measure for that resource, or a combination thereof from the plurality of resource request records.

11. The method of claim 7, further comprising:

modifying the classifier for the resource access measures, using resource access measures from the plurality of resource access measures associated with resources from the plurality of resources having known security classifications.

12. A resource classification system comprising:

a hardware processor to identify a plurality of resource requests, each resource request from the plurality of resource requests associated with a resource from a plurality of resources by a resource identifier of that resource;

the hardware processor to determine whether a plurality of resource access measures were previously generated for the plurality of resource requests;

the hardware processor to update the plurality of resource access measures based on the plurality of resource requests responsive to the determination that the plurality of resource access measures were previously generated, wherein a classifier for the previously generated plurality of resource access measures is modified and utilized as the classifier for the resource access measures;

a resource access measurement hardware processor to generate the plurality of resource access measures based on the plurality of resource requests responsive to the determination that the plurality of resource access measures were not previously generated for the plurality of resource requests, and define a new classifier from the plurality of generated resource access measures to be utilized as the classifier for the resource access measures, wherein each resource access measure from the plurality of resource access measures is associated with the resource from the plurality of resources;

a classifier hardware processor to define the classifier for the resource access measures using resource access measures from the plurality of resource access measures associated with resources from the plurality of resources having known security classifications, and to apply the classifier for the resource access measures to each resource access measure from the plurality of resource access measures to generate a classification result for the resource from the plurality of resources associated with that resource access measure, wherein each resource access measure is a value that describes a number of unique clients that have requested access to the resource; and a security hardware processor to assign a security classification to each resource from the plurality of resources based on the classification result for that resource.

13. The system of claim 12, further comprising:

a resource request processor to receive the plurality of resource request records associated with the plurality of resource requests from a plurality of resource authorities.

14. The system of claim 12, wherein:

the plurality of resource requests is a first plurality of resource requests;

the plurality of resource access measures is a first plurality of resource access measures generated at the resource access measurement processor a first time;

the resource access measurement processor is configured to update at a second time a second plurality of resource access measures based on a second plurality of resource requests, each resource access measure from the second plurality of resource access measures associated with the resource from the plurality of resources; and the classifier hardware processor is configured to update the classifier for the resource access measures using resource access measures from the second plurality of resource access measures associated with the resources from the plurality of resources having known security classifications.

15. The system of claim 12, wherein:

the resource access measurement processor is configured to determine from the plurality of resource requests at least one of a host access measure for each resource from the plurality of resources, a group access measure each resource from the plurality of resources, or a sub-resource access measure for each resource from the plurality of resources to generate the plurality of resource access measures.

* * * * *